US012768960B2

(12) United States Patent
Liang et al.

(10) Patent No.: US 12,768,960 B2
(45) Date of Patent: Oct. 20, 2026

(54) METHOD FOR SIGNAL PROCESSING FOR LIDAR, DETECTION METHOD OF LIDAR, AND LIDAR

(71) Applicant: HESAI TECHNOLOGY CO., LTD., Shanghai (CN)

(72) Inventors: Feng Liang, Shanghai (CN); Shaoqing Xiang, Shanghai (CN)

(73) Assignee: HESAI TECHNOLOGY CO., LTD., Shanghai (CN)

( * ) Notice: Subject to any disclaimer, the term of this patent is extended or adjusted under 35 U.S.C. 154(b) by 413 days.

(21) Appl. No.: 18/584,400

(22) Filed: Feb. 22, 2024

(65) Prior Publication Data

US 2024/0192338 A1 Jun. 13, 2024

Related U.S. Application Data

(63) Continuation of application No. PCT/CN2022/081308, filed on Mar. 17, 2022.

(30) Foreign Application Priority Data

Aug. 23, 2021 (CN) ......................... 202110967923.4

(51) Int. Cl.
*G01S 7/4865* (2020.01)
*G01S 7/481* (2006.01)
(Continued)

(52) U.S. Cl.
CPC .......... *G01S 7/4865* (2013.01); *G01S 7/4814* (2013.01); *G01S 7/4816* (2013.01); *G01S 7/497* (2013.01); *G01S 17/10* (2013.01)

(58) Field of Classification Search
CPC .... G01S 7/4865; G01S 7/4814; G01S 7/4816; G01S 7/497; G01S 17/10; G01S 17/931; G01S 7/487; G01S 7/4802; Y02A 90/10
See application file for complete search history.

(56) References Cited

U.S. PATENT DOCUMENTS

2001/0052844 A1* 12/2001 Shirai .................... B60Q 9/008 340/436
2005/0204808 A1* 9/2005 DiFoggio ................ G01V 1/50 73/152.58

(Continued)

FOREIGN PATENT DOCUMENTS

CH 695749 8/2006
CN 103792526 5/2014

(Continued)

OTHER PUBLICATIONS

Extended European Search Report in European Appln. No. 22859848.8, mailed on Oct. 23, 2024, 15 pages.

(Continued)

*Primary Examiner* — Michael E Teitelbaum
(74) *Attorney, Agent, or Firm* — Fish & Richardson P.C.

(57) ABSTRACT

This disclosure provides methods and apparatuses for a LiDAR. In an implementation, a method includes receiving an echo pulse of a detection laser pulse reflected from an object, determining, based on a first threshold, a first threshold pulse width of the echo pulse, determining, based on a second threshold greater than or equal to the first threshold, a second threshold pulse width of the echo pulse, determining a difference between the first threshold pulse width and the second threshold pulse width, and determining a slope of the echo pulse based on the difference and a reference pulse width difference.

20 Claims, 9 Drawing Sheets

10

(51) Int. Cl.
*G01S 7/497* (2006.01)
*G01S 17/10* (2020.01)

(56) References Cited

U.S. PATENT DOCUMENTS

| | | | | |
|---|---|---|---|---|
| 2019/0086546 | A1 | 3/2019 | Tsishkou et al. | |
| 2020/0345237 | A1 | 11/2020 | Ishii et al. | |
| 2021/0072395 | A1 | 3/2021 | Yoshizawa et al. | |
| 2021/0132197 | A1 | 5/2021 | Wachter et al. | |
| 2023/0152457 | A1* | 5/2023 | Fernandez | B60W 60/00 701/23 |

FOREIGN PATENT DOCUMENTS

| | | |
|---|---|---|
| CN | 106019300 | 10/2016 |
| CN | 111123237 A | 5/2020 |
| CN | 116047484 | 5/2023 |
| EP | 3529628 | 8/2019 |
| JP | 2019-109193 | 7/2019 |

OTHER PUBLICATIONS

International Search Report and Written Opinion in Appln. No. PCT/CN2022/081308, mailed on Jun. 1, 2022, 12 pages (with English translation).

International Preliminary Report on Patentability in Appln. No. PCT/CN2022/081308, mailed on Mar. 7, 2024, 9 pages (with English translation).

* cited by examiner

METHOD FOR SIGNAL PROCESSING FOR LIDAR, DETECTION METHOD OF LIDAR, AND LIDAR

CROSS-REFERENCE TO RELATED APPLICATIONS

This application is a continuation of International Application No. PCT/CN2022/081308, filed on Mar. 17, 2022, which claims priority to Chinese Patent Application No. 202110967923.4, filed on Aug. 23, 2021. The disclosures of the aforementioned applications are hereby incorporated by reference in their entireties.

TECHNICAL FIELD

This disclosure relates to the technical field of photoelectric detection, and in particularly, relates to a method for signal processing for a LiDAR, a detection method of a LiDAR, and a LiDAR.

BACKGROUND

LiDAR detects a distance by actively emitting a laser pulse and then receiving a laser pulse reflected from a target object. The LiDAR can measure a reflectivity of the target object based on a ratio of the pulse intensity and emission intensity returned by the LiDAR as well as distance correction. At present, all point clouds outputted from mainstream vehicle LiDARs only include distance and reflectivity information. Changes of an echo pulse slope (broadening) are typically associated with some particular reflections or target objects, so that determining the changes of the echo pulse slope is crucial for ascertaining the reflections or target objects. How to improve the accuracy of recognition and perception of the target object to provide strong guarantee for positioning, navigation, obstacle avoidance, or the like is one of the current research directions in the field of LiDARs.

FIG. 1 shows oblique incidence of a detection laser pulse of a LiDAR onto a target object. As shown in FIG. 1, the detection laser pulse is obliquely projected onto the target object to form a light spot. For the same detection laser pulse, the time points of reflection of echoes from different positions on the target oblique plane are different, so that the slope of the synthesized echo pulse becomes smaller.

FIG. 2 shows projection of a detection laser pulse of a LiDAR onto dispersed particulates. As shown in FIG. 2, it is commonly found in flying dusts, misty rain, tree crowns, or the like where part of the detection laser pulse is emitted while the other part is reflected by particulates. The time points of reflection of echoes from particulates at different positions are different, and the slope of the superimposed echo pulse becomes smaller.

When the laser pulse received by a detector of the LiDAR is unsaturated (the intensity is weak), an echo pulse intensity-pulse width relationship curve under normal incidence can be established to obtain a reference pulse width, where the normal incidence refers to perpendicular incidence of the laser pulse emitted from the LiDAR onto a target object, and the pulse width of the echo pulse under normal incidence is the reference pulse width. As shown in FIG. 3, the abscissa is the reference pulse width $W_n$, and the ordinate is the pulse peak intensity $peak_n$. Based on this curve, the reference pulse width under normal incidence corresponding to the actual pulse peak intensity is determined, and then the actual pulse broadening is determined by comparison between the reference pulse width and the actual pulse width.

However, in some cases, when the laser pulse is projected onto a highly reflective target object, the pulse received by the detector of the LiDAR may be saturated. As shown in FIG. 4, its peak value information cannot reflect the true peak intensity of the received signal, thereby failing to obtain the reference pulse width based on the echo pulse intensity-pulse width relationship curve in FIG. 3, failing to compare between the reference pulse width (or termed as standard pulse width) and the actual pulse width, and failing to perform further ascertainment.

The content in the Background only discloses technologies known to the discloser and does not necessarily represent the existing techniques in the field.

SUMMARY

In view of one or more drawbacks of the existing techniques, this disclosure designs a method for signal processing for a LiDAR, including:

- S11: receiving an echo pulse of a detection laser pulse reflected from an object;
- S12: determining a first threshold pulse width of the echo pulse based on a first threshold, and determining a second threshold pulse width of the echo pulse based on a second threshold, wherein the first threshold is lower than the second threshold;
- S13: computing a difference between the first threshold pulse width and the second threshold pulse width; and
- S14: determining a slope of the echo pulse based on the difference and a reference pulse width difference.

Based on an aspect of this disclosure, an echo pulse when the detection laser pulse is normally incident onto the object is a reference echo pulse, and a difference between a first threshold reference pulse width of the reference echo pulse at the first threshold and a second threshold reference pulse width of the reference echo pulse at the second threshold is the reference pulse width difference.

Based on an aspect of this disclosure, the step S14 includes: using a ratio of the reference pulse width difference to the difference between the first threshold pulse width and the second threshold pulse width as the slope of the echo pulse.

Based on an aspect of this disclosure, the method further includes:

- calibrating the LiDAR, and establishing a first relationship curve between the first threshold reference pulse width of the reference echo pulse and the reference pulse width difference.

Based on an aspect of this disclosure, the method further includes:

- calibrating the LiDAR, and establishing a second relationship curve between the second threshold reference pulse width of the reference echo pulse and the reference pulse width difference.

Based on an aspect of this disclosure, the step S14 further includes: determining the reference pulse width difference based on the first relationship curve after determining the first threshold pulse width in the step S12.

Based on an aspect of this disclosure, the step S14 further includes: determining the reference pulse width difference based on the second relationship curve after determining the second threshold pulse width in the step S12.

Based on an aspect of this disclosure, the step S11 further includes: determining a peak value of the echo pulse, and performing the steps S12-S14 when the peak value is greater than or equal to the second threshold; otherwise, determining the first threshold pulse width of the echo pulse based on the first threshold, determining the first threshold reference pulse width based on the peak value of the echo pulse, and determining the slope of the echo pulse based on a ratio of the first threshold reference pulse width to the first threshold pulse width.

Based on an aspect of this disclosure, the method further includes:

calibrating the LiDAR, and establishing a third relationship curve between the peak value of the reference echo pulse and the first threshold reference pulse width.

Based on an aspect of this disclosure, the step of determining the slope of the echo pulse based on the first threshold pulse width and the first threshold reference pulse width includes: determining the first threshold reference pulse width based on the peak value of the echo pulse and the third relationship curve.

Based on an aspect of this disclosure, the method further includes:

S15: outputting the slope of the echo pulse.

Based on an aspect of this disclosure, the method further includes: outputting the slope of the echo pulse when the slope of the echo pulse is outside a preset slope range.

Based on an aspect of this disclosure, the detection laser pulse is a single pulse or a pulse sequence.

This disclosure further designs a detection method of a LiDAR, including:

S21: emitting a detection laser pulse;

S22: receiving an echo pulse of the detection laser pulse reflected from an object;

S23: determining a distance to and/or a reflectivity of the object based on the echo pulse; and

S24: executing the method for signal processing as mentioned above, to obtain a slope of the echo pulse.

Based on an aspect of this disclosure, the detection method further includes:

recognizing a category of the object based on one or more of the slope of the echo pulse, an outline of the object in a point cloud image, the distance to the object, and the reflectivity of the object.

Based on an aspect of this disclosure, the detection method further includes emitting a detection laser pulse sequence, and determining a slope of a first echo pulse or a slope of each echo pulse in an echo pulse sequence.

This disclosure further designs a LiDAR, including:

an emitter unit configured to emit a detection laser pulse;

a receiver unit configured to receive an echo pulse of the detection laser pulse reflected from an object; and a signal processor unit configured to execute the method for signal processing as mentioned above.

Based on an aspect of this disclosure, the LiDAR further includes:

a storage unit configured to store one or more of the first relationship curve, the second relationship curve, and the third relationship curve.

In this disclosure, a slope of each pulse is additionally outputted for supplementary information for characteristics of detected object, on the basis of basic information (e.g., a distance and a reflectivity) of a point cloud of a LiDAR. The distance, the reflectivity, and pulse slope characteristics can be used for detection, recognition, and classification to achieve higher recognition and perception accuracy.

BRIEF DESCRIPTION OF THE DRAWINGS

The drawings that form a part of this disclosure are used to provide further understanding of this disclosure. The illustrative embodiments of this disclosure and description thereof are used to interpret this disclosure, and do not impose any improper limitation on this disclosure. In the figures.

DETAILED DESCRIPTION

Figure 1:
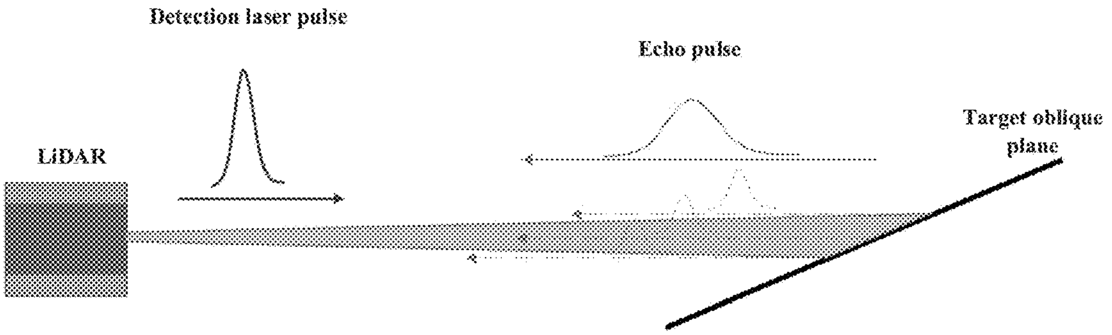
FIG. 1 shows oblique incidence of a detection laser pulse of a LiDAR onto a target object.
Figure 2:
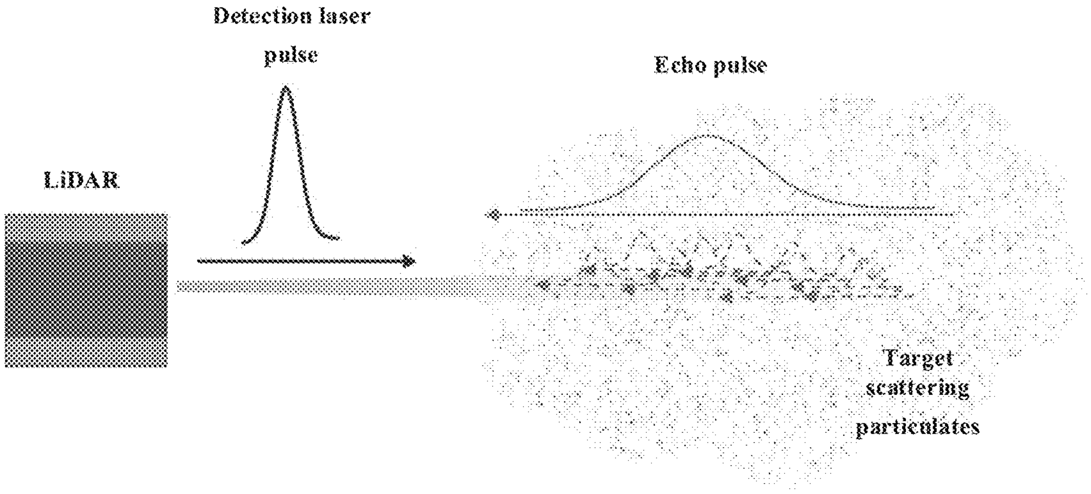
FIG. 2 shows projection of a detection laser pulse of a LiDAR onto dispersed particulates.
Figure 3:
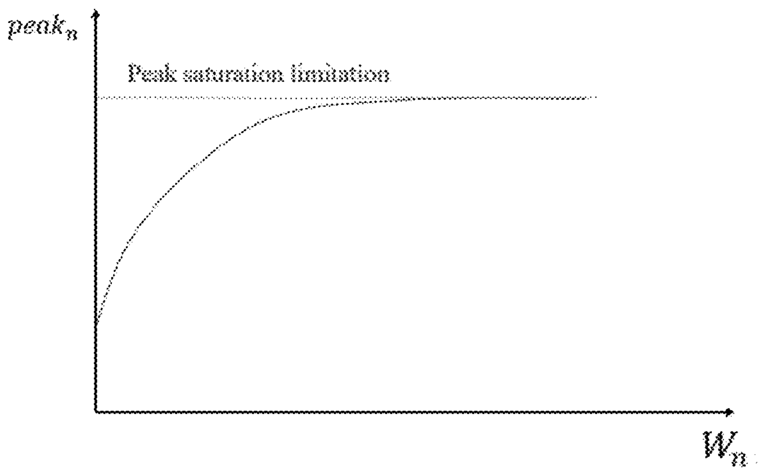
FIG. 3 shows an echo pulse intensity-pulse width relationship curve under normal incidence.
Figure 4:
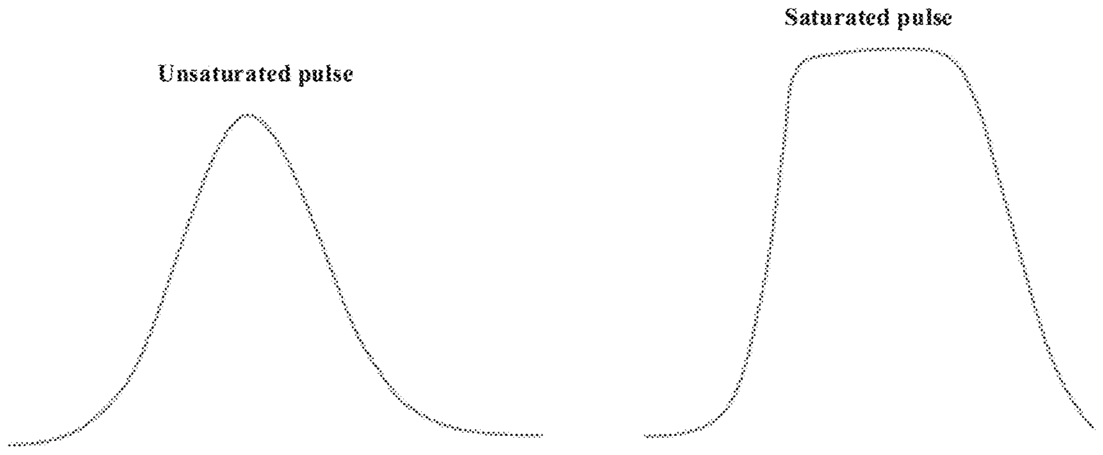
FIG. 4 shows a schematic diagram of an unsaturated pulse and a saturated pulse.

Only some illustrative embodiments are briefly described below. As would be understood by those skilled in the art, the described embodiments may be modified in various ways without departing from the spirit or scope of this disclosure. Accordingly, the drawings and description are considered essentially illustrative and non-restrictive.

In the description of this disclosure, it should be understood that the directions or position relationships indicated by the terms, such as "center," "longitudinal," "transverse," "length," "width," "thickness," "above," "below," "front," "back," "left," "right," "vertical," "horizontal," "top," "bottom," "inner," "outer," "clockwise," and "counterclockwise," are based on the directions or position relationships shown in the drawings, are only provided to facilitate describing this disclosure and simplifying the description, rather than indicating or implying that the apparatus or element referred to must have a particular direction, or be constructed and operated in a particular direction, and therefore cannot be construed as limiting this disclosure. In addition, the terms "first" and "second" are only used for the purpose of description, and cannot be understood as indicating or implying relative importance or implicitly indicating the number of indicated technical features. Thus, features defined with "first" or "second" may explicitly or implicitly include one or more of the features. In the description of this disclosure, "plurality" refers to two or more than two, unless otherwise specifically defined.

In the description of this disclosure, it should be noted that, unless otherwise specifically stipulated and defined, the terms "installation," "connected," and "connection" should be understood in a broad sense, for example, may be a fixed connection, or may be a detachable connection or an integrated connection; may be a mechanical connection, or may be an electrical connection, or may be mutually communicable; may be a direct connection, or may be an indirect connection through an intermediate medium, or may be an internal communication between two elements or an interaction relationship between two elements. For those of ordinary skill in the art, the specific meanings of the above terms in this disclosure may be understood based on specific circumstances.

In this disclosure, unless otherwise explicitly stipulated and defined, the first feature "above" or "below" the second feature may include the first feature in direct contact with the second feature, or may include the first feature not being in direct contact with the second feature, but in contact with the second feature through other features between them. Further, the first feature "above" and "over" the second feature includes the first feature being right above and obliquely above the second feature, or merely indicates that the first feature is horizontally above the second feature. The first feature "below" and "under" the second feature includes the first feature being right above and obliquely above the second feature, or merely indicates that the first feature is horizontally below the second feature.

The disclosure below provides many different embodiments or examples to implement different structures of this disclosure. To simplify the disclosure of this disclosure, components and arrangements of particular examples are described below. Of course, they are merely examples, and are not intended to limit this disclosure. Further, in this disclosure, reference numbers and/or reference letters may be repeated in different examples. Such repetition is for purposes of simplicity and clarity, and itself does not indicate a relationship between the discussed embodiments and/or arrangements. In addition, this disclosure provides examples of various particular processes and materials, but those of ordinary skill in the art can appreciate the application of other processes and/or the use of other materials.

The method for determining a slope of an echo pulse presented in this disclosure includes computing a pulse width difference of the echo pulse based on dual thresholds, and then comparing the pulse width difference with a calibration value of a reference pulse width difference under normal incidence stored inside the LiDAR, thus determining the pulse slope. This method is not limited to the intensity of the echo pulse, that is, no matter whether the echo pulse is saturated or not, a pulse slope value that can characterize the state of a target object can be outputted by using the method of this disclosure, thereby allowing point cloud users to achieve higher accuracy of filtering, recognition, and monitoring of the target object based on salient features of the slope value.

The preferred embodiments of this disclosure are described below with reference to the drawings. It should be understood that the preferred embodiments described here are only used to illustrate and interpret this disclosure, and are not intended to limit this disclosure.

Figure 5:
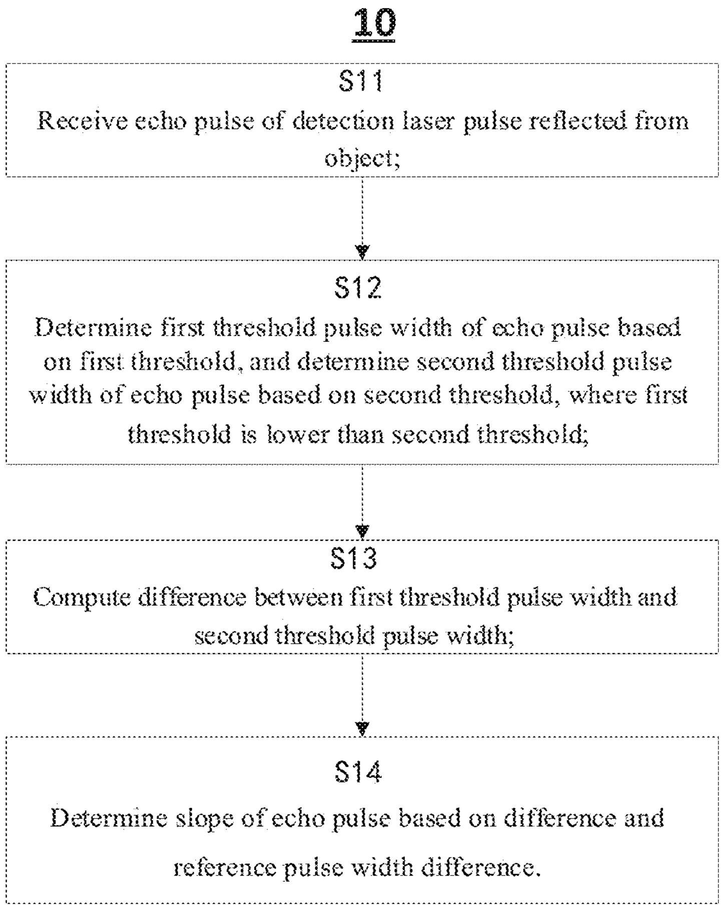
FIG. 5 shows a flowchart of a method for signal processing for a LiDAR in an embodiment of this disclosure.

This disclosure designs a method 10 for signal processing for a LiDAR. As shown in FIG. 5, the method 10 for signal processing includes:

At step S11, an echo pulse of a detection laser pulse reflected from an object is received. The LiDAR typically includes a emitting unit, a receiver unit, and a signal processor unit, where the emitting unit is configured to emit a detection laser pulse to a three-dimensional environment around the LiDAR, the detection laser pulse undergoes diffuse reflection on a target object in the three-dimensional environment, and part of the light, that is, the echo pulse, is reflected back to the LiDAR, and is received and converted into an electrical signal by the receiver unit; and the signal processor unit receives the electrical signal and computes ranging information of an obstacle. In this step, the emitter unit emits the detection laser pulse, and the receiver unit receives the echo pulse reflected from the object.

At step S12, a first threshold pulse width of the echo pulse is determined based on a first threshold Th1, and a second threshold pulse width of the echo pulse is determined based on a second threshold Th2, where the first threshold Th1 is lower than the second threshold Th2. The first threshold Th1 and the second threshold Th2 may be determined values, or may be dynamically changed. For example, when the system noise is high, the lower first threshold is increased, and the increased first threshold is lower than the second threshold. The system noise is determined, for example, by sampling, and the first threshold can be set based on the mean value and standard deviation of the system noise.

Figure 6:
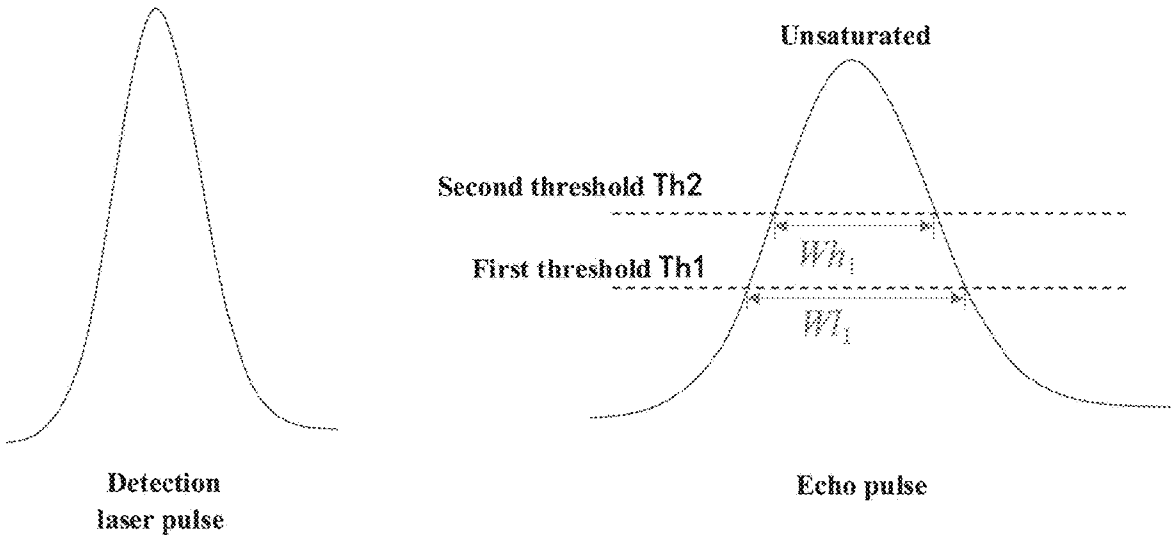
FIG. 6 shows a schematic diagram of a first threshold, a second threshold, and a corresponding pulse width under unsaturated conditions in an embodiment of this disclosure.
Figure 7:
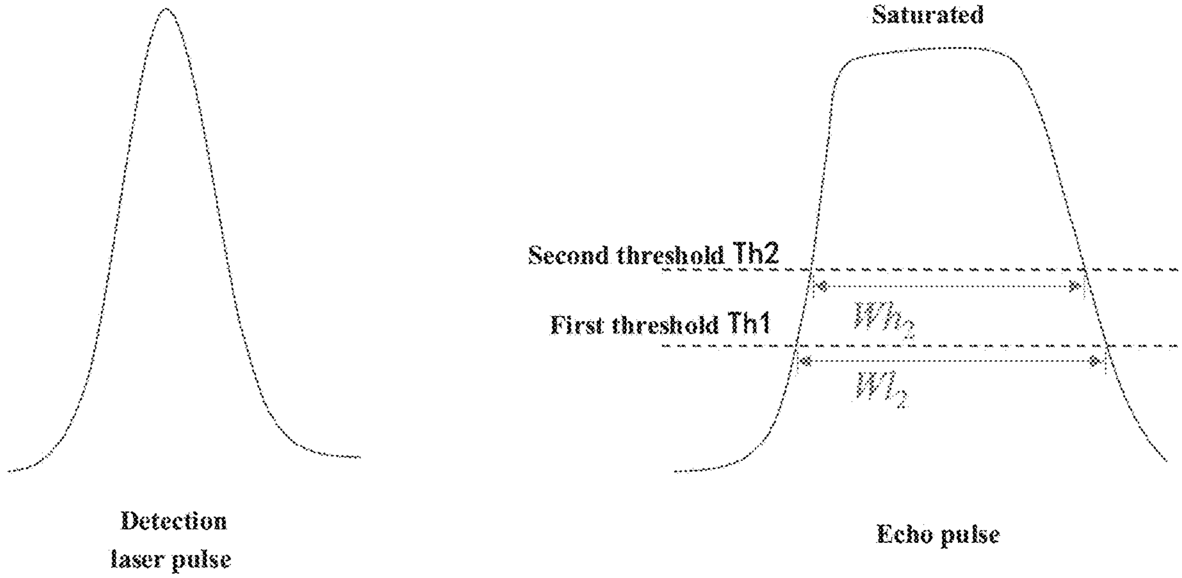
FIG. 7 shows a schematic diagram of a first threshold, a second threshold, and a corresponding pulse width under saturated conditions in an embodiment of this disclosure.

When the echo pulse is unsaturated, with reference to FIG. 6, when the first threshold Th1 and the second threshold Th2 respectively pass through the echo pulse, the first threshold pulse width $Wl_1$ is determined based on the first threshold Th1, and the second threshold pulse width $Wh_1$ is determined based on the second threshold Th2; and when the echo pulse is saturated, with reference to FIG. 7, when the first threshold Th1 and the second threshold Th2 pass through the echo pulse, the first threshold pulse width $Wl_2$ is determined based on the first threshold Th1, and the second threshold pulse width $Wh_2$ is determined based on the second threshold Th2.

At step S13, a difference between the first threshold pulse width and the second threshold pulse width is computed. With reference to FIG. 6, when the echo pulse is unsaturated, the difference between the first threshold pulse width $Wl_1$ and the second threshold pulse width $Wh_1$ satisfies $\Delta W_1 = Wl_1 - Wh_1$; and with reference to FIG. 7, when the echo pulse is saturated, the difference between the first threshold pulse width $Wl_2$ and the second threshold pulse width $Wh_2$ satisfies $\Delta W_2 = Wl_2 - Wh_2$. Hence, the computation of the pulse width difference does not depend on whether the echo pulse is saturated, and the pulse width difference can be computed as long as the peak value of the echo pulse exceeds the second threshold. The peak value of the echo pulse being lower than the second threshold is introduced in subsequent paragraphs.

At step S14, a slope of the echo pulse is determined based on the pulse width difference of the echo pulse and a reference pulse width difference. The slope value of the echo pulse can be determined based on comparison between the pulse width difference of the echo pulse determined in the step S13 and the reference pulse width difference. In this disclosure, the slope of the echo pulse is an indicator for characterizing steepness of the rising edge and/or falling edge of the echo pulse.

Figure 8:
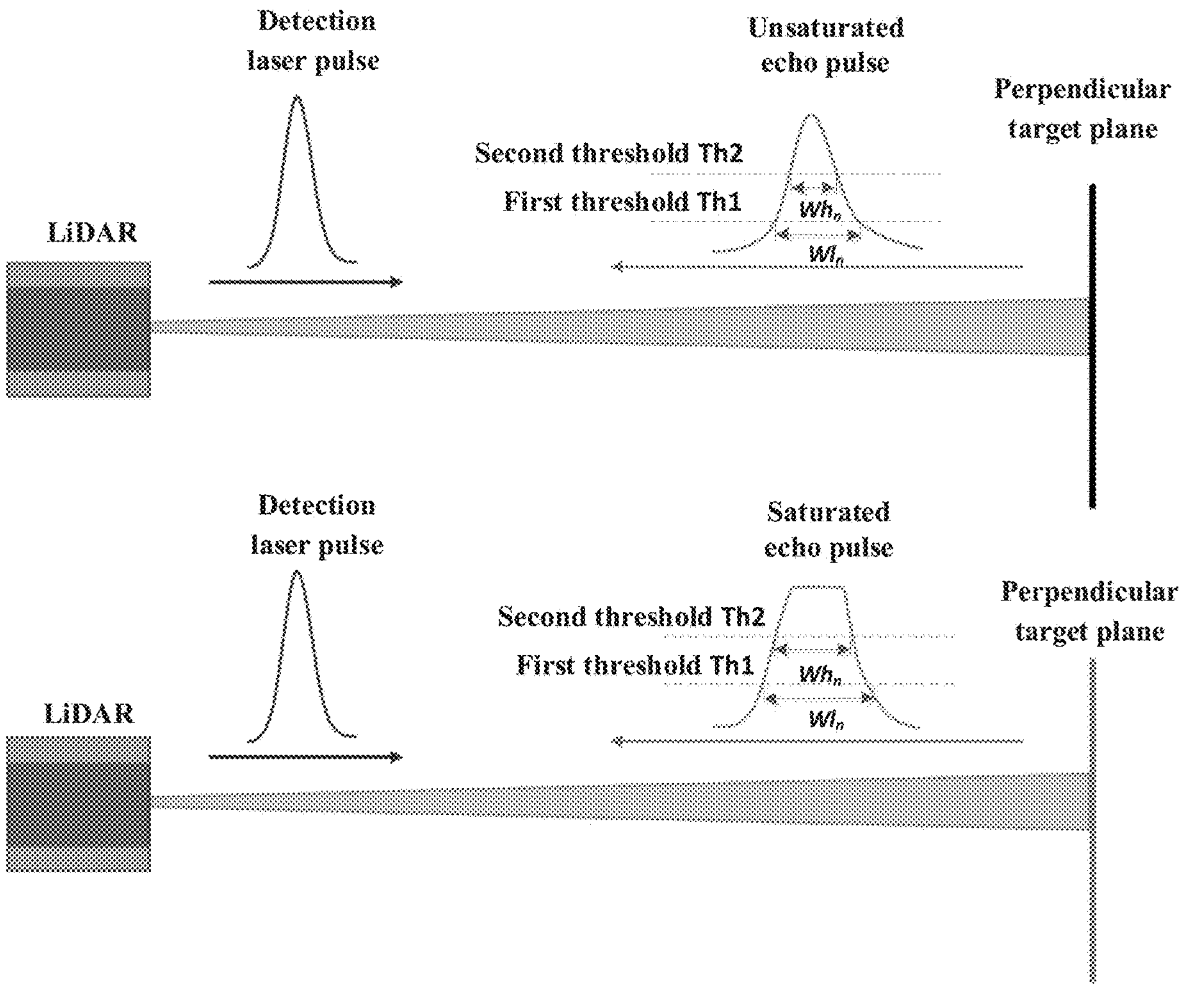
FIG. 8 shows a schematic comparison diagram of a pulse slope under normal incidence in an embodiment of this disclosure.
Figure 9:
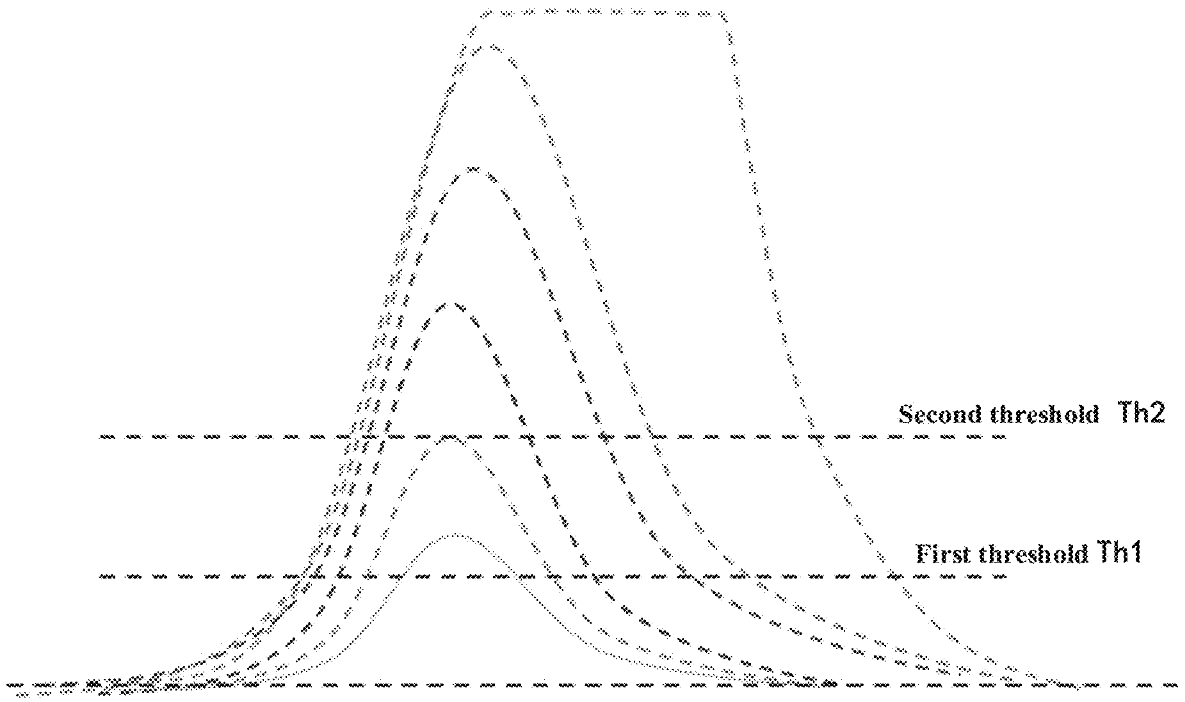
FIG. 9 shows a schematic diagram of different reference echo pulse intensities under normal incidence in an embodiment of this disclosure.

Based on a preferred embodiment of this disclosure, an echo pulse when the detection laser pulse is normally incident onto the object is a reference echo pulse, and a difference between a first threshold reference pulse width of the reference echo pulse at the first threshold Th1 and a second threshold reference pulse width of the reference echo pulse at the second threshold Th2 is the reference pulse width difference. With Reference to FIG. 8, the echo pulse under normal incidence may be unsaturated, or may be saturated. In either of the two cases, the determination of the reference pulse width difference based on dual thresholds is not affected. Specifically, when the LiDAR is calibrated, the detection laser pulse emitted from the emitter unit is perpendicularly incident onto the target object, and the receiver unit receives a reference echo pulse reflected from the target object, determines the first threshold reference pulse width $Wl_n$ based on the first threshold Th1, determines the second threshold reference pulse width $Wh_n$ based on the second threshold Th2, and then determines the pulse width difference $\Delta W_n = Wl_n - Wh_n$ between the first threshold reference pulse width $Wl_n$ and the second threshold reference pulse width $Wh_n$. When the LiDAR is calibrated, a given detection laser pulse may correspond to a plurality of reference echo pulses with different intensities under normal incidence, which is associated with the reflectivity of the target object. With reference to FIG. 8 and FIG. 9, for example, target objects with different reflectivities are arranged at equal distances (e.g., standard reflective plates with different reflectivities); the given detection laser pulse is normally incident onto the target objects with different reflectivities; and the reference echo pulses reflected from the target objects with different reflectivities have different broadening, different pulse intensities, and different reference pulse width differences. How to select a reference pulse width difference corresponding to an actual echo pulse is described in detail in subsequent paragraphs.

Based on a preferred embodiment of this disclosure, the step S14 includes: a ratio of the reference pulse width difference to the difference between the first threshold pulse width and the second threshold pulse width is determined as the slope of the echo pulse. That is, in the step S13, the pulse width difference $\Delta W$ of the actual echo pulse is determined (the pulse width difference $\Delta W$ of the actual echo pulse is $\Delta W_2$ when the echo pulse is saturated; and is $\Delta W_1$ when the echo pulse is unsaturated), the corresponding reference pulse width difference thereof is $\Delta W_n$, and the relative pulse width difference is computed as per $$\Delta W_r = \frac{\Delta W}{\Delta W_n}.$$

The larger the relative pulse width difference is, the relatively smaller the slope is. Thus, the formula for computing the slope is:

$$\text{slope} = 1/\Delta W_r = \frac{\Delta W_n}{\Delta W}$$

To sum up, the method 10 for signal processing determines the pulse width difference of the echo pulse at two thresholds based on dual thresholds, and then determines the slope of the echo pulse based on the reference pulse width difference and the relationship between the two, and preferably, computes the slope based on the ratio between the two.

Figure 10:
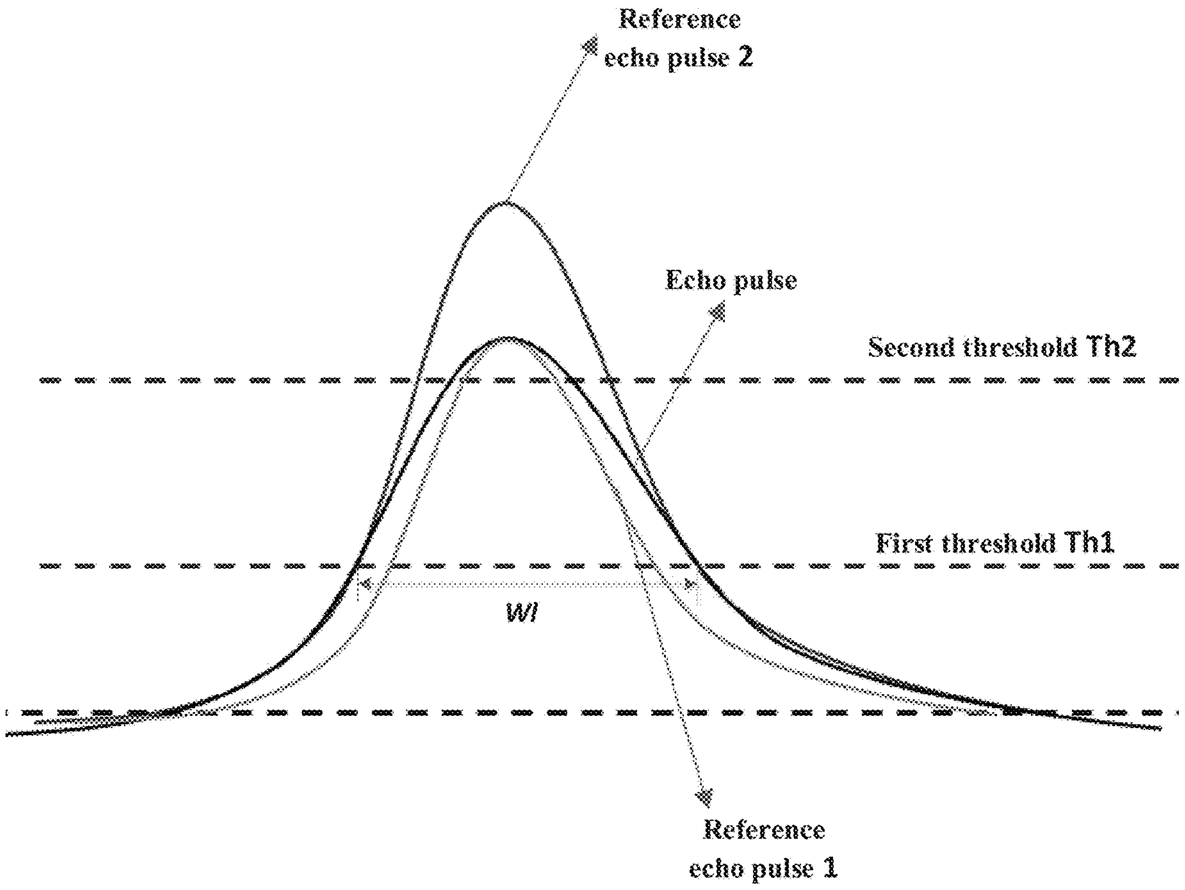
FIG. 10 shows a schematic diagram of selecting a reference echo pulse width based on a first threshold pulse width in an embodiment of this disclosure.

Regarding how to select the reference pulse width difference corresponding to the actual echo pulse, based on an embodiment of this disclosure, with reference to FIG. 10, when the LiDAR is calibrated, the emitter unit emits a detection laser pulse normally incident onto a first target object with a first reflectivity to obtain a reference echo pulse 1; and the emitter unit emits a same detection laser pulse normally incident onto a second target object with a second reflectivity to obtain a reference echo pulse 2. The second reflectivity is higher than the first reflectivity. Therefore, as shown in FIG. 10, the peak value of the reference echo pulse 2 is higher than the peak value of the reference echo pulse 1, and the width of the reference echo pulse 2 is also larger. FIG. 10 schematically shows the reference echo pulses 1 and 2. When the LiDAR is actually calibrated, a larger number of reference echo pulses can be received as required. Each of the reference echo pulses corresponds to a target object with a reflectivity.

Based on an embodiment of this disclosure, a reference echo pulse corresponding to the first threshold pulse width of the echo pulse can be determined based on the first threshold pulse width of the echo pulse. In a practical application, after receiving the actual echo pulse, the receiver unit receives a first threshold pulse width Wl of the actual echo pulse based on the first threshold. As can be seen from FIG. 10, a first threshold reference pulse width of the reference echo pulse 2 is equal to the first threshold pulse width of the actual echo pulse, so that the reference echo pulse 2 can be used as the reference echo pulse of the actual echo pulse. Then, the pulse width difference of the actual echo pulse is computed based on the method 10 for signal processing, and then compared with the reference pulse width difference of the reference echo pulse 2, to determine the pulse slope value. In a practical application, the broadening of the actual echo pulse is complex, and it is needed to pre-store as many calibration values of the reference echo pulse width difference as possible to improve the computation accuracy of the pulse slope.

Figure 11:
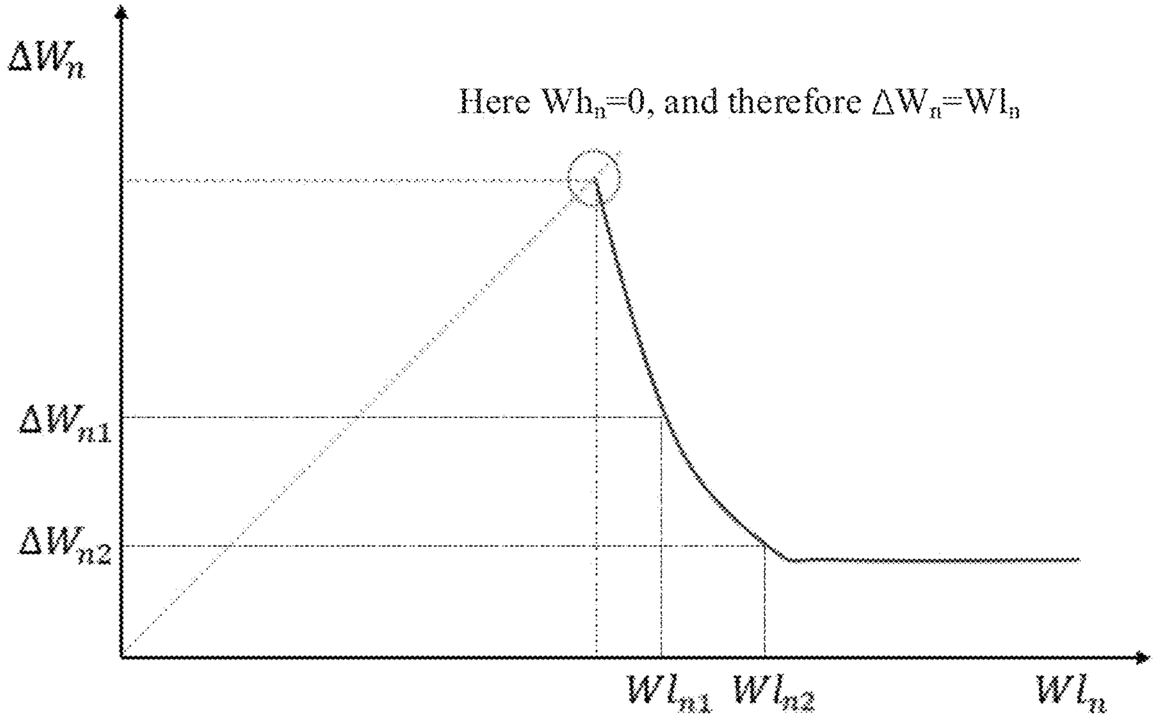
FIG. 11 shows a first relationship curve between a first threshold reference pulse width under normal incidence and a reference pulse width difference in an embodiment of this disclosure.

Based on a preferred embodiment of this disclosure, the method 10 for signal processing further includes: calibrating the LiDAR, and establishing a first relationship curve between the first threshold reference pulse width of the reference echo pulse and the reference pulse width difference. Specifically, when the LiDAR is calibrated, the detection laser pulse is perpendicularly incident onto the target object, and the receiver unit receives the reference echo pulse reflected from the target object. For example, target objects with different reflectivities are arranged at fixed distances, the first threshold reference pulse width and the reference pulse width difference of the reference echo pulse are measured for each target object, and the first relationship curve between the first threshold reference pulse width and the reference pulse width difference is fitted based on a plurality of groups of values, or alternatively, the first relationship curve can be determined by connecting a plurality of groups of numerical points with line segments. As shown in FIG. 11, the abscissa is the first threshold reference pulse width $Wl_n$ corresponding to the first threshold, the ordinate is the reference pulse width difference $\Delta W_n$ of the reference echo pulse under normal incidence, where $\Delta W_n$ is a value irrelevant to distance, so that whether a target plane is arranged at a fixed distance in the calibration process does not affect the technical solutions of this disclosure, nor some embodiments of the calibration process are limited in this disclosure.

Based on a preferred embodiment of this disclosure, the step S14 further includes: determining the reference pulse width difference based on the first relationship curve after determining the first threshold pulse width in the step S12. Specifically, regarding the actual echo pulse, the first threshold pulse width is determined based on the first threshold, such as the $Wl_1$ in FIG. 6, and the second threshold pulse width is determined based on the second threshold, such as the $Wh_1$ in FIG. 6. The pulse width difference of the echo pulse is computed as per $\Delta W_1 = Wl_1 - Wh_1$, then the reference pulse width difference $\Delta W_{n1}$ corresponding to the first threshold pulse width $Wl_1$, that is, the reference pulse width difference $\Delta W_{n1}$ corresponding to the first threshold reference pulse width $Wl_{n1}$ which is equal to the first threshold pulse width $Wl_1$, is determined from the first relationship curve shown in FIG. 11, and then the corresponding slope value is determined:

$$\text{slope} = \frac{\Delta W_{n1}}{\Delta W_1}$$

Similarly, regarding the first threshold pulse width $Wl_2$ and the second threshold pulse width $Wh_2$ in FIG. 7, the pulse width difference of the echo pulse is computed as per $\Delta W_2 = Wl_2 - Wh_2$, then the reference pulse width difference $\Delta W_{n2}$ corresponding to the first threshold pulse width $Wl_2$, that is, the reference pulse width difference $\Delta W_{n2}$ corresponding to the first threshold reference pulse width $Wl_{n2}$ which is equal to the first threshold pulse width $Wl_2$, is determined from the relationship curve between the first threshold reference pulse width and the reference pulse width difference shown in FIG. 11, and then the corresponding slope value is determined:

$$\text{slope} = \frac{\Delta W_{n2}}{\Delta W_2}$$

Figure 12:
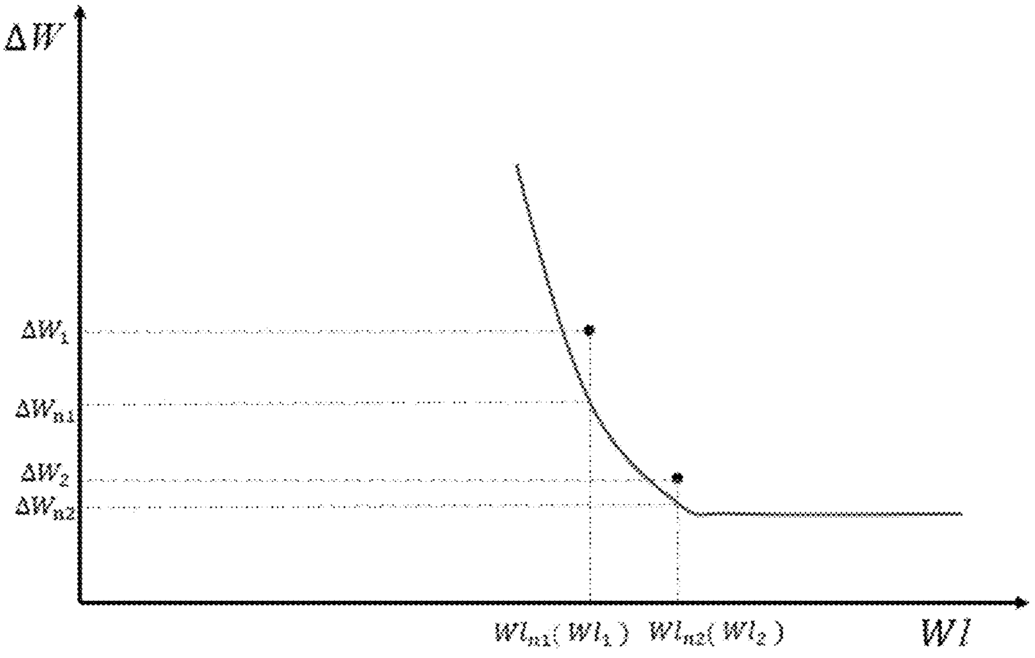
FIG. 12 shows a schematic diagram of a first threshold pulse width and a pulse width difference of an actual echo and a first relationship curve under normal incidence in an embodiment of this disclosure.

FIG. 12 shows a schematic diagram of a first threshold pulse width and a pulse width difference of an actual echo and a first relationship curve under normal incidence in an embodiment of this disclosure. In FIG. 12, discrete points represent actual echoes, and the curve represents the first relationship curve under normal incidence. An actual echo pulse 1 is, for example, the echo pulse shown in FIG. 6, where the first threshold pulse width is $Wl_1$, the pulse width difference is $\Delta W_1$, the corresponding first threshold reference pulse width thereof is $Wl_{n1}$, and the corresponding reference pulse width difference in the first relationship curve is $\Delta W_{n1}$. With reference to FIG. 12, the pulse width difference $\Delta W_1$ is above the first relationship curve; and an actual echo pulse 2 is, for example, the echo pulse shown in FIG. 7, where the first threshold pulse width is $Wl_2$, the pulse width difference is $\Delta W_2$, the corresponding first threshold reference pulse width thereof is $Wl_{n2}$, and the corresponding reference pulse width difference in the first relationship curve is $\Delta W_{n2}$. With reference to FIG. 12, the pulse width difference $\Delta W_2$ is above the first relationship curve. Apparently, the pulse width differences of the actual echo pulses 1 and 2 are each greater than their respective reference pulse width differences, and the farther the pulse width difference is away from the first relationship curve, the smaller the slope of the corresponding echo pulse is.

The above description provides determining the reference pulse width difference based on the first relationship curve and then determining the pulse slope. Based on another preferred embodiment of this disclosure, the method 10 for signal processing may further include: calibrating the LiDAR, and establishing a second relationship curve between the second threshold reference pulse width of the reference echo pulse and the reference pulse width difference. The specific method is similar to the method for establishing the first relationship curve, except that the abscissa becomes the second threshold reference pulse width $Wh_n$ corresponding to the second threshold, and the ordinate is the reference pulse width difference $\Delta W_n$ of the reference echo pulse under normal incidence.

After the second relationship curve is determined, the reference pulse width difference can also be determined based on the second relationship curve. The step S14 further includes: determining the reference pulse width difference based on the second relationship curve after determining the second threshold pulse width in the step S12. Specifically, when the LiDAR is calibrated, the detection laser pulse is perpendicularly incident onto the target object, and the receiver unit receives the reference echo pulse reflected from the target object. For example, target objects with different reflectivities are arranged at fixed distances, the second threshold reference pulse width and the reference pulse width difference of the reference echo pulse are measured for each target object, and the second relationship curve between the second threshold reference pulse width and the reference pulse width difference is fitted based on a plurality of groups of values, where the abscissa of the second relationship curve is the second threshold reference pulse width $Wh_n$ corresponding to the second threshold Th2, and the ordinate of the second relationship curve is the reference pulse width difference $\Delta W_n$ of the reference echo pulse under normal incidence, where $\Delta W_n$ is a value irrelevant to distance.

After the reference pulse width difference $\Delta W_n$ is determined, the slope value of the echo pulse is computed based on a method similar to the above method, which is not be repeated here.

Based on a preferred embodiment of this disclosure, the step S11 further includes: determining a peak value of the echo pulse, and performing the steps S12-S14 when the peak value is greater than or equal to the second threshold; otherwise, determining the first threshold pulse width of the echo pulse based on the first threshold, determining the first threshold reference pulse width based on the peak value of the echo pulse, and determining the slope of the echo pulse based on a ratio of the first threshold reference pulse width to the first threshold pulse width.

Specifically, peak value information of the echo pulse of the detection laser pulse reflected from the object is acquired, for example, by sampling, and a maximum value of the sampling intensity is extracted for use as the peak value. For an unsaturated echo pulse, the peak value information reflects the true peak intensity of the received signal, while for a saturated echo pulse, the peak value information does not reflect the true peak intensity of the received signal, but no matter whether the echo pulse is saturated or not, its peak value information can be determined. Or alternatively, a comparator is used to ascertain whether the peak value of the echo pulse is higher/lower than the first threshold Th1 or the second threshold Th2 without determining the maximum value of its sampling intensity. FIG. 9 shows a schematic diagram of different echo pulse intensities (e.g., intensity changes caused by a detection distance or reflectivity). When the peak value of the echo pulse is greater than or equal to the second threshold Th2, the actual pulse width difference is computed based on the first threshold Th1 and the second threshold Th2, then the reference pulse width difference corresponding to the first threshold Th1 is determined based on the first relationship curve, and finally the pulse slope is determined based on the ratio between the two; or the reference pulse width difference corresponding to the second threshold Th2 is determined based on the second relationship curve, and the pulse slope is determined based on the ratio of the actual pulse width difference to the reference pulse width difference, as described above.

When the peak value of the echo pulse is less than the second threshold Th2, the first threshold pulse width Wl of the echo pulse is acquired based on the first threshold Th1, the corresponding first threshold reference pulse width Win is determined based on the peak intensity $peak_n$ of the echo pulse, and the slope of the echo pulse is acquired based on the ratio of the first threshold reference pulse width $Wl_n$ to the first threshold pulse width Wl. Based on a preferred embodiment of this disclosure, the first threshold reference pulse width is determined by: calibrating the LiDAR, and establishing a third relationship curve between the peak value of the reference echo pulse and the first threshold reference pulse width.

Figure 13:
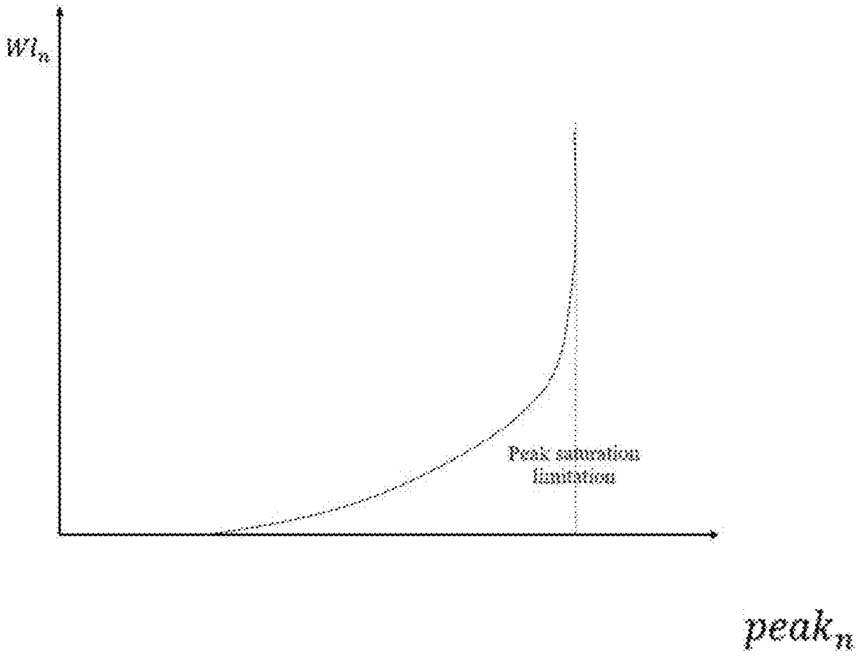
FIG. 13 shows a third relationship curve between a first threshold pulse width and a pulse peak under normal incidence in an embodiment of this disclosure.

Based on a preferred embodiment of this disclosure, the method 10 for signal processing further includes: calibrating the LiDAR, and establishing the third relationship curve between the peak intensity of the reference echo pulse and the first threshold reference pulse width. Specifically, when the LiDAR is calibrated, the detection laser pulse is perpendicularly incident onto the target object, and the receiver unit receives the reference echo pulse reflected from the target object. For example, target objects with different reflectivities are arranged at fixed distances, the peak value of the reference echo pulse and first threshold reference pulse width are measured for each target object, and the third relationship curve between the peak intensity of the reference echo pulse and the first threshold reference pulse width is fitted based on a plurality of groups of values, or alternatively, the third relationship curve can be determined by connecting a plurality of groups of numerical points with line segments. As shown in FIG. 13, the abscissa is the peak intensity $peak_n$ of the reference echo pulse, and the ordinate is the first threshold reference pulse width $Wl_n$. Some embodiments of the calibration process are not limited in this disclosure. Preferably, in the calibration process of the LiDAR, the third relationship curve can also be established and saved when the first relationship curve and/or the second relationship curve are/is established. That is, the peak value of the reference echo pulse is acquired; when the peak value is greater than or equal to the second threshold, the first relationship curve and/or the second relationship curve are/is established; and when the peak value is less than the second threshold value, the third relationship curve is established.

Based on a preferred embodiment of this disclosure, the step of determining the slope of the echo pulse based on the first threshold pulse width and the first threshold reference pulse width includes: determining the first threshold reference pulse width based on the peak value of the echo pulse and the third relationship curve.

The first threshold reference pulse width $Wl_n$ under normal incidence is determined based on the peak intensity of the echo pulse, and in this case, the first threshold pulse width Wl of the actual echo pulse is determined based on the first threshold. The relative pulse width can be computed as per the following formula $W_r$:

$$W_r = \frac{Wl}{Wl_n}$$

The larger the relative pulse width is, the relatively smaller the slope is. Therefore, the slope can be computed as per the following formula:

$$\text{slope} = 1/W_r = \frac{Wl_n}{Wl}$$

The first relationship curve, the second relationship curve, and the third relationship curve are described above. When the LiDAR is calibrated, perpendicular target planes with different reflectivities are arranged at fixed distances, the detection laser pulse is perpendicularly incident onto the target object, the receiver unit receives the reference echo pulse reflected from the target object, and a plurality of reference echo pulses can be determined by changing the reflectivity of the target object. These reference echo pulses are divided into two groups based on their peak values, where the peak values of the reference echo pulses in the first group are greater than or equal to the second threshold Th2, and the peak values of reference echo pulses in the second group are lower than the second threshold Th2. The first relationship curve and/or the second relationship curve can be determined using the reference echo pulses in the first group, and the third relationship curve can be determined using the reference echo pulses in the second group. In this way, the plurality of relationship curves can be determined in one calibration process, to improve the calibration efficiency.

To sum up, in the method 10 for signal processing, when the peak value of the echo pulse is greater than or equal to the second threshold, the pulse width difference of the actual echo pulse is computed based on the dual thresholds, the pulse width difference of the corresponding reference echo pulse is determined based on the first threshold or the second threshold, and the two are compared to acquire the slop value of the actual echo pulse; and when the peak value of the echo pulse is less than the second threshold, the first threshold pulse width of the actual echo is computed based on the first threshold, the first threshold reference pulse width of the corresponding reference echo pulse is determined based on the peak value, and the two are compared to acquire the slope value of the actual echo pulse. The pulse slope information can supplement information about some target reflectors. For example, when the reflectors are obliquely arranged at a large angle with respect to the detection laser pulse or the reflectors are misty rain, dusts, or the like, the slope value greatly deviates from the value of an object under normal incidence. In this case, the slope value is a salient feature that allows point cloud users to achieve higher accuracy of filtering, recognition, and monitoring of the target object.

Based on a preferred embodiment of this disclosure, the method 10 for signal processing further includes:

At Step S15, the slope of the echo pulse is outputted. Different pulse conditions are ascertained based on the slope value, and corresponding processing is performed. Particulates (misty rain, dusts, or the like) and an oblique plane can be further ascertained based on a point cloud image formed by them (typically there is a rough outline of the shape of the oblique plane in the point cloud image), or the shape or form of the target object can be further ascertained in combination with a smart recognition algorithm, for example, whether there is misty rain or dusts around the LiDAR, whether the target object has a large inclined surface, or the like.

Based on a preferred embodiment of this disclosure, the method further includes: the slope of the echo pulse is outputted when the slope of the echo pulse is outside a preset slope range. An echo pulse that exceeds a slope range threshold is used for particular incidence or target object ascertainment. The above-mentioned slope information can, for example, be provided to an autonomous driving unit of a vehicle, so that the autonomous driving unit can achieve higher accuracy of filtering, recognition, and monitoring of the target object accordingly.

Based on a preferred embodiment of this disclosure, the detection laser pulse is a single pulse or a pulse sequence. The above-mentioned method 10 for signal processing computes the pulse slope taking a single pulse as an example. Those skilled in the art can understand that when the detection laser pulse includes a sequence composed of a plurality of pulses, the method 10 for signal processing can also be used to separately compute the slope of each pulse there among. If the slopes of the plurality of pulses in the sequence each exceed the slope range threshold, the credibility of recognizing them as misty rain, dusts, or the like is enhanced.

Figure 14:
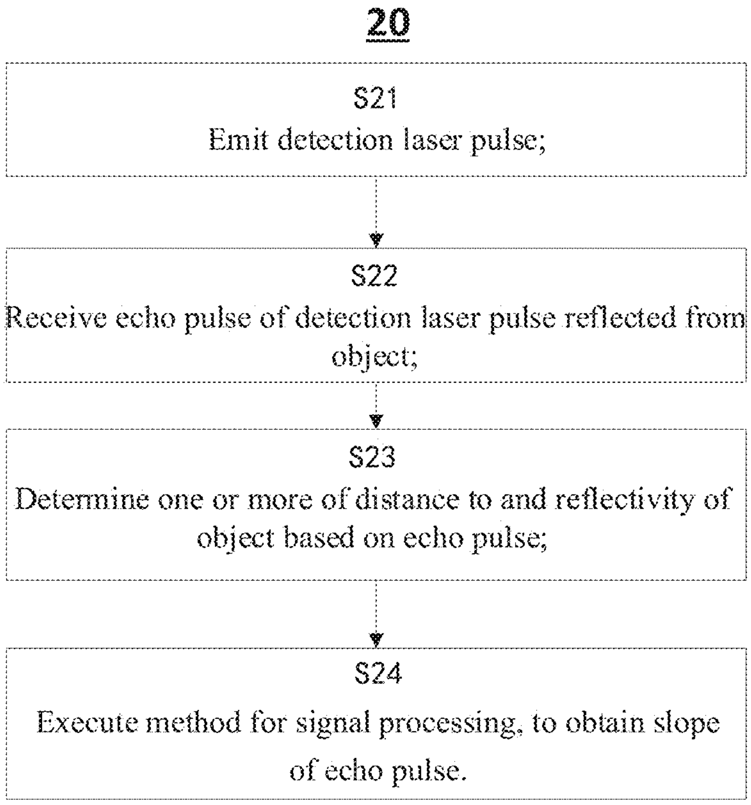
FIG. 14 shows a flowchart of a detection method of a LiDAR in an embodiment of this disclosure.

This disclosure further designs a detection method 20 using a LiDAR. With reference to FIG. 14, the detection method 20 includes:

At Step S21, a detection laser pulse is emitted;

At Step S22, an echo pulse of the detection laser pulse reflected from an object is received;

At Step S23, a distance to and/or a reflectivity of the object is determined based on the echo pulse; and At Step S24, the method 10 for signal processing as mentioned above is executed, to obtain a slope of the echo pulse.

Based on a preferred embodiment of this disclosure, the detection method 20 further includes: recognizing a category of the object based on one or more of the slope of the echo pulse, an outline of the object in a point cloud image, the distance to the object, and the reflectivity of the object.

Based on a preferred embodiment of this disclosure, the detection method 20 further includes a detection laser pulse sequence is emitted, and a slope of a first echo pulse or a slope of each echo pulse in an echo pulse sequence is determined.

Figure 15:
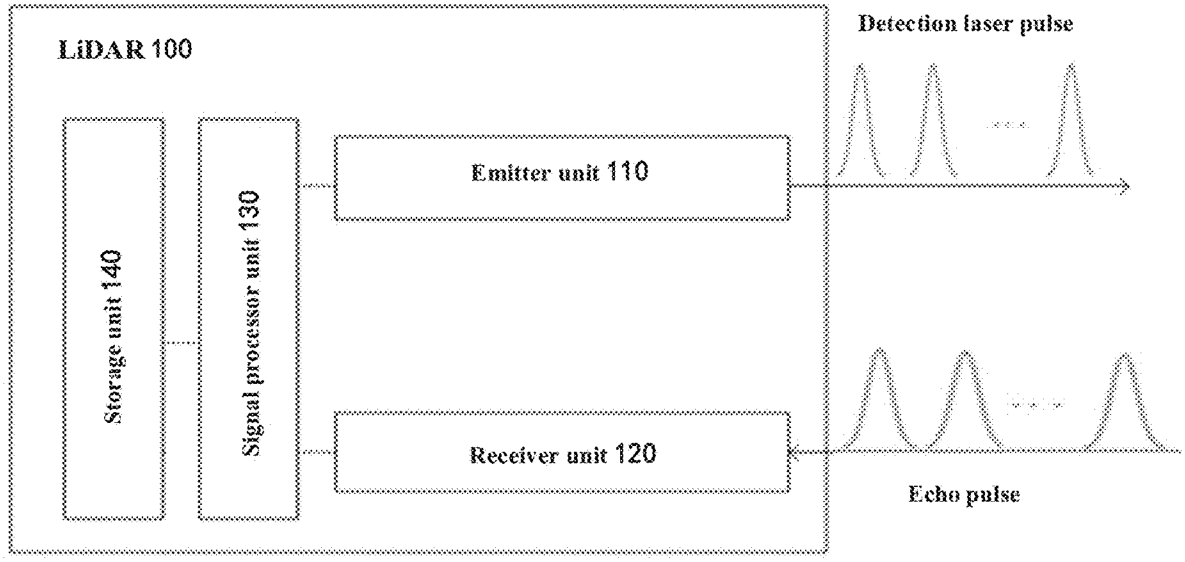
FIG. 15 shows a module diagram of a LiDAR in an embodiment of this disclosure.

This disclosure further designs a LiDAR 100. With reference to FIG. 15, the LiDAR 100 includes: a emitter unit 110, a receiver unit 120, and a signal processor unit 130. The emitter unit 110 is configured to emit a detection laser pulse; the receiver unit 120 is configured to receive an echo pulse of the detection laser pulse reflected from an object; and the signal processor unit 130 is configured to execute the method 10 for signal processing as mentioned above.

Based on a preferred embodiment of this disclosure, the LiDAR 100 further includes: a storage unit 140 configured to store one or more of the first relationship curve, the second relationship curve, and the third relationship curve.

Various preferred embodiments of this disclosure are described above. Based on the solutions of various embodiments of this disclosure, no matter whether the echo pulse is saturated (the echo pulse in FIG. 7), the echo pulse is unsaturated (the echo pulse in FIG. 6), or the echo pulse intensity is small (the peak value of the echo pulse is less than the second threshold), the slope of the echo pulse can be accurately determined, so that point cloud users can integrate the distance, the reflectivity, and pulse slope characteristics to detect, recognize, and categorize the target object. The information dimension of the echo pulse is additionally provided, to help the point cloud users to achieve higher recognition and perception accuracy.

Finally, it should be noted that the above description merely provides preferred embodiments of this disclosure, which are not intended to limit this disclosure. Although this disclosure has been described in detail with reference to the above-mentioned embodiments, those skilled in the art can still modify the technical solutions disclosed in the above-mentioned embodiments, or equivalently replace some of the technical features thereof. Any modification, equivalent replacement, improvement, or the like made within the spirit and principle of this disclosure should be encompassed within the scope of protection of this disclosure.

What is claimed is:

1. A method for a LiDAR, including:

receiving an echo pulse of a detection laser pulse reflected from an object;

determining, based on a first threshold, a first threshold pulse width of the echo pulse;

determining, based on a second threshold greater than or equal to the first threshold, a second threshold pulse width of the echo pulse;

determining a difference between the first threshold pulse width and the second threshold pulse width; and determining a slope of the echo pulse based on the difference and a reference pulse width difference.

2. The method of claim 1, wherein the reference pulse width difference is a difference between a first threshold reference pulse width of a reference echo pulse at the first threshold and a second threshold reference pulse width of the reference echo pulse at the second threshold, and wherein the reference echo pulse is an echo pulse generated when the detection laser pulse is incident on the object.

3. The method of claim 2, wherein determining the slope of the echo pulse includes:

determining a ratio of the reference pulse width difference to the difference between the first threshold pulse width and the second threshold pulse width as the slope of the echo pulse.

4. The method of claim 2, wherein the method further includes:

calibrating the LiDAR; and establishing a first relationship curve between the first threshold reference pulse width of the reference echo pulse and the reference pulse width difference.

5. The method of claim 2, wherein the method further includes:

calibrating the LiDAR; and establishing a second relationship curve between the second threshold reference pulse width of the reference echo pulse and the reference pulse width difference.

6. The method of claim 4, wherein determining the slope of the echo pulse further includes:

determining the reference pulse width difference based on the first relationship curve after determining the first threshold pulse width.

7. The method of claim 5, wherein determining the slope of the echo pulse further includes:

determining the reference pulse width difference based on the second relationship curve after determining the second threshold pulse width.

8. The method of claim 1, wherein a peak value of the echo pulse is greater than or equal to the second threshold.

9. The method of claim 1, wherein the method further includes:

emitting a detection laser pulse;

receiving an echo pulse of the detection laser pulse reflected from an object; and determining at least one of a distance to or a reflectivity of the object based on the echo pulse.

10. The method of claim 9, wherein the method further includes:

identifying a category of the object based on one or more of the slope of the echo pulse, an outline of the object in a point cloud image, the distance to the object, or the reflectivity of the object.

11. The method of claim 9, wherein the method further includes:

emitting a detection laser pulse sequence; and determining a slope of a first echo pulse or a slope of each echo pulse in an echo pulse sequence.

12. The method of claim 1, wherein the method further includes:

outputting the slope of the echo pulse.

13. The method of claim 1, wherein the method further includes:

outputting the slope of the echo pulse in response to determining that the slope of the echo pulse is outside a preset slope range.

14. The method of claim 1, wherein the detection laser pulse is a single pulse or a pulse sequence.

15. A method for a LiDAR, including:

receiving an echo pulse of a detection laser pulse reflected from an object;

determining that a peak value of the echo pulse is less than a first threshold;

determining a first threshold pulse width of the echo pulse based on a second threshold;

determining a first threshold reference pulse width based on the peak value of the echo pulse; and determining a slope of the echo pulse based on a ratio of the first threshold reference pulse width to the first threshold pulse width.

16. The method of claim 15, wherein the method further includes:

calibrating the LiDAR; and establishing a relationship curve between the peak value of a reference echo pulse and the first threshold reference pulse width, wherein the reference echo pulse is an echo pulse generated when the detection laser pulse is incident on the object.

17. The method claim 16, wherein determining the slope of the echo pulse includes:

determining the first threshold reference pulse width based on the peak value of the echo pulse and the relationship curve.

18. A LiDAR, including:

an emitter configured to emit a detection laser pulse;

a receiver configured to receive an echo pulse of the detection laser pulse reflected from an object;

a processor; and a storage storing programming instructions for execution by the processor to:

receive an echo pulse of a detection laser pulse reflected from an object;

determine, based on a first threshold, a first threshold pulse width of the echo pulse;

determine, based on a second threshold greater than or equal to the first threshold, a second threshold pulse width of the echo pulse;

determine a difference between the first threshold pulse width and the second threshold pulse width; and determine a slope of the echo pulse based on the difference and a reference pulse width difference.

19. The LiDAR of claim 18, wherein the reference pulse width difference is a difference between a first threshold reference pulse width of a reference echo pulse at the first threshold and a second threshold reference pulse width of the reference echo pulse at the second threshold, and wherein the reference echo pulse is an echo pulse generated when the detection laser pulse is incident on the object.

20. The Lidar of claim 19, wherein determine the slope of the echo pulse includes:

determining a ratio of the reference pulse width difference to the difference between the first threshold pulse width and the second threshold pulse width as the slope of the echo pulse.

* * * * *